United States Patent
Arntson et al.

[15] 3,703,106
[45] Nov. 21, 1972

[54] STEERING COLUMN ASSEMBLY

[72] Inventors: Gary L. Arntson, Lansing; Tom Rasmussen, Okemos, both of Mich.

[73] Assignee: General Motors Corporation, Detroit, Mich.

[22] Filed: Aug. 20, 1971

[21] Appl. No.: 173,489

[52] U.S. Cl. .................................................74/492
[51] Int. Cl. ...............................................B62d 1/18
[58] Field of Search................................74/492, 493

[56] References Cited

UNITED STATES PATENTS 3,415,140  12/1968  Bien et al.......................74/492

FOREIGN PATENTS OR APPLICATIONS 1,176,976  1/1970  Great Britain................74/492

*Primary Examiner*—Milton Kaufman
*Attorney*—W. E. Finken et al.

[57] ABSTRACT

An energy absorbing steering column assembly for an automotive vehicle, the steering column assembly including a collapsible column structure and a combination support and guide member rigidly attached to the vehicle body remote from the instrument panel structure thereof and defining a channel of decreasing depth adapted to slidably receive a pair of lugs on a bracket rigidly attached to the column structure and axially movable therewith during energy absorbing collapse. During collapse of the column structure the bracket is constrained by the combination member to move in a path of motion effecting optimum performance while the lugs are progressively more tightly wedged in the combination member to effect supplementary energy absorption.

5 Claims, 10 Drawing Figures

INVENTORS
Gary L. Arntson, &
BY Tom Rasmussen

Saul Schwartz
ATTORNEY

PATENTED NOV 21 1972  3,703,106
SHEET 2 OF 2
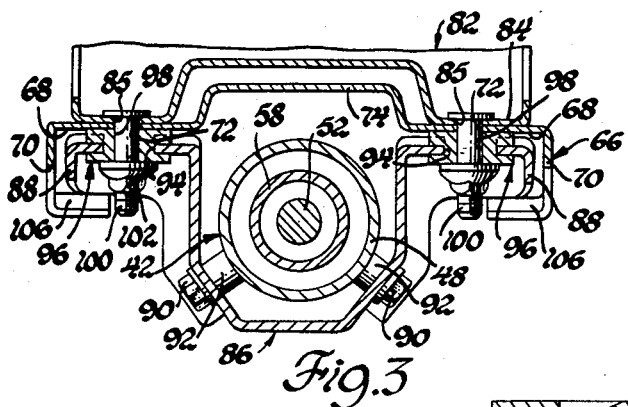
Fig.3
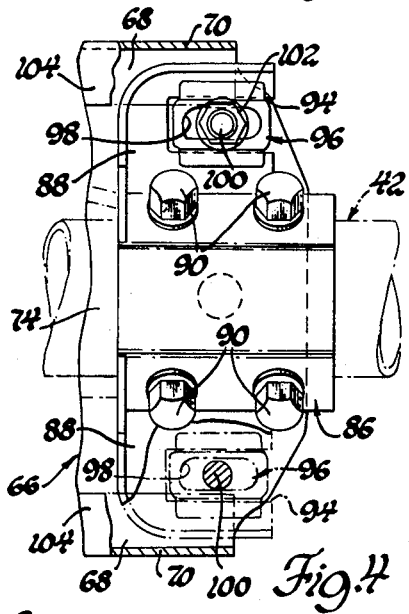
Fig.4
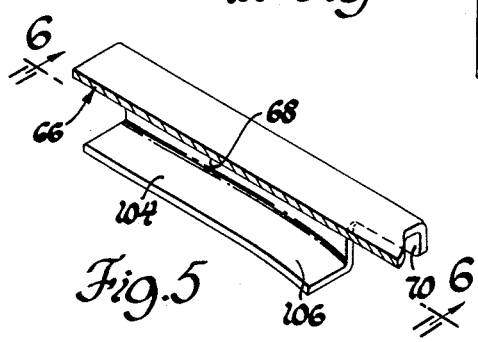
Fig.5
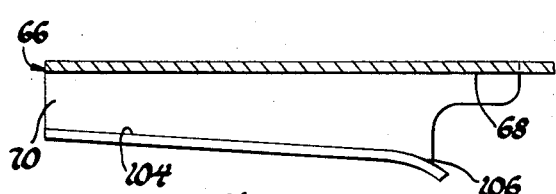
Fig.6
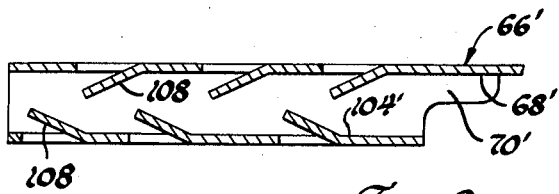
Fig.8
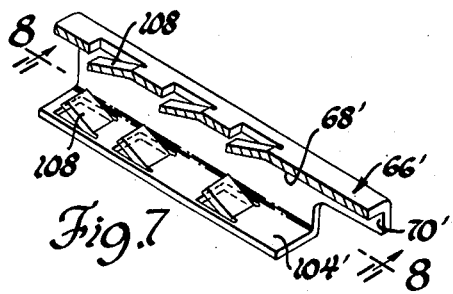
Fig.7
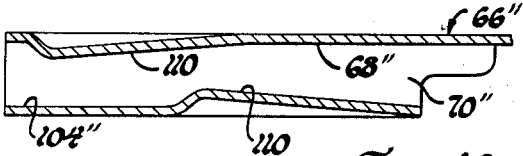
Fig.10
Fig.9
INVENTORS
Gary L. Arntson, &
BY Tom Rasmussen
Saul Schwartz
ATTORNEY

STEERING COLUMN ASSEMBLY

This invention relates generally to vehicle steering column assemblies having an energy absorbing collapsible column structure therein and more particularly to supplementary energy absorbing means adapted to effect energy absorption only after a predetermined amount of collapse of the column structure.

The peak or maximum force experienced by the body of a person impacting an energy absorbing steering column structure occurs virtually at the instant of impact as the inertia of the column structure is overcome just prior to the commencement of collapse. Subsequently, the magnitude of the force diminishes substantially. The magnitude of the peak force must, or course, be kept within the tolerance of the human body and it therefore follows that the magnitude of the force exerted by the column structure and effecting energy absorption after the inertia is overcome is much less than that which could be tolerated. Consequently, a considerable amount of travel must be provided to effect the proper amount of energy absorption at the lower force levels. To take advantage of the energy absorbing efficiency of higher force magnitudes within the tolerance of the human body, a number of proposals have been put forth for providing supplementary energy absorbing means which become operative only after the inertia of the column structure is overcome. These systems, however, usually entail substantial alteration of the configuration of the column structure relative to those structures presently used and are, therefore, not economically attractive alternatives. A steering column assembly according to this invention accomplishes the result of supplementing the energy absorbing capacity of currently used column structures, the steering column assembly requiring only modification of the means supporting the column structure on the vehicle body.

Accordingly, the primary feature of this invention is that it provides an improved automotive energy absorbing steering column assembly of the type having a collapsible column structure including a first portion anchored to the vehicle body and a second portion releasably supported on the vehicle body for axial bodily movement during collapse, the second portion being guided during collapse so that an optimum column structure attitude is maintained. Another feature of this invention is that it provides an improved steering column assembly of the character described wherein supplementary energy absorbing means are provided on the column structure guide means, the energy absorbing means becoming operative only after the occurrence of a predetermined amount of column collapse. Still another feature of this invention resides in the provision of an improved steering column assembly of the character described wherein the guide means includes a combination support and guide member which engages a bracket on the column structure during energy absorbing collapse of the latter to maintain the column structure in an optimum attitude during collapse and which has thereon a pair of bottom flanges which cooperate with the guide member in forming a channel adapted to receive the bracket during energy absorbing collapse of the column structure, the channel being tapered to engage the bracket and progressively more forcefully retard collapse of the column structure after a predetermined amount of collapse has occurred to thereby effect supplementary energy absorption. These and other features of this invention will be readily apparent from the following specification and from the drawings wherein:

FIG. 3 is a sectional view taken generally along the plane indicated by lines 3—3 in FIG. 2;

FIG. 4 is a sectional view taken generally along the plane indicated by lines 4—4 in FIG. 2;

FIG. 5 is a fragmentary perspective view of a portion of the combination guide and support member;

FIG. 6 is an enlarged sectional view taken generally along the plane indicated by lines 6—6 in FIG. 5;

FIG. 7 is a view similar to FIG. 5 but showing a first modification of the combination guide and support member;

FIG. 8 is an enlarged sectional view taken generally along the plane indicated by lines 8—8 in FIG. 7;

FIG. 9 is a view similar to FIG. 5 but showing a second modification of the combination guide and support member; and, FIG. 10 is an enlarged sectional view taken generally along the plane indicated by lines 10—10 in FIG. 9.

Figure 1:
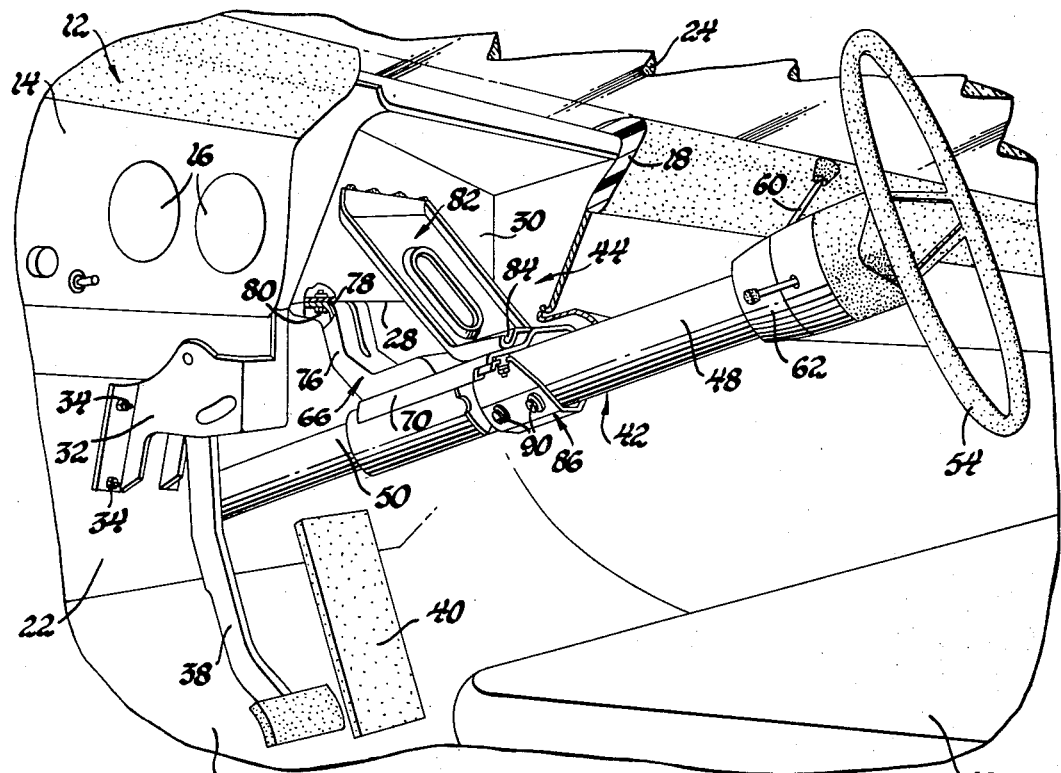
FIG. 1 is a fragmentary partially broken away perspective view of the interior of an automobile vehicle body having a steering column assembly according to this invention.

Referring now to FIG. 1 of the drawings, a portion of the interior of an automobile vehicle body is there shown which includes a front seat 10 and an instrument panel structure 12 having a vertical panel 14 supporting a plurality of guages 16 or the like, the vertical panel having affixed thereto a resilient energy absorbing pad 18. The front seat 10 is conventionally mounted on a floor panel 20, the latter merging with a generally vertical firewall 22. The firewall extends upwardly behind the instrument panel structure generally to the lower marginal edge of a windshield 24.

Figure 2:
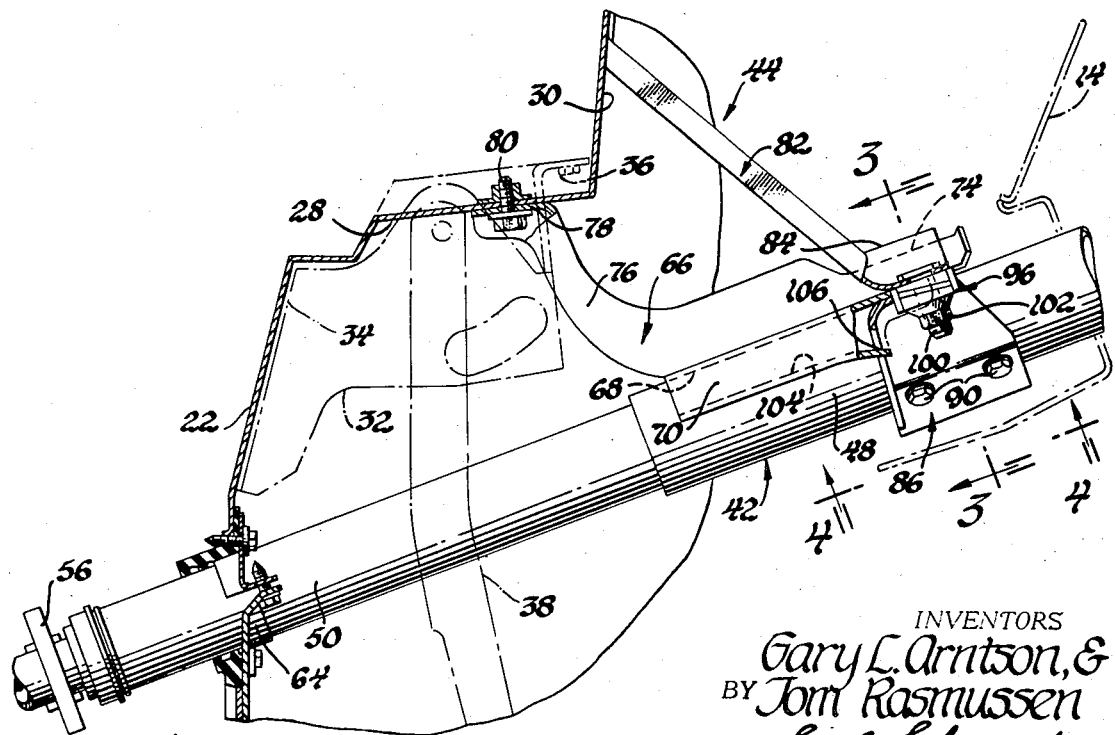
FIG. 2 is a fragmentary partially broken away side elevational view of an automobile vehicle body having a steering column assembly according to this invention.

As seen best in FIG. 2, an L-shaped portion of the firewall 22, structurally rigid with respect to the vehicle body, is situated behind vertical panel 14 and includes a horizontal side 28 and a vertical side 30. A brake support bracket 32 is fastened to the firewall below the L-shaped portion and to horizontal side 28 by a plurality of bolts 34 and 36 and pivotally supports a brake pedal 38, the latter being situated adjacent a conventional accelerator pedal 40.

Referring particularly to FIGS. 1, 2, and 3, an improved energy absorbing steering column assembly is mounted on the vehicle body and includes, generally, a collapsible column structure 42 of the energy absorbing type and a mounting arrangement 44 adapted to normally rigidly support the column structure remote from the instrument panel structure in a predetermined operational attitude and to guide the column structure during energy absorbing collapse for effecting optimum performance. For a full and complete description of the column structure 42, reference may be made to U.S. Pat. No. 3,392,599, issued July 16, 1968 in the name of R. L. White and assigned to the assignee of this invention. Basically, however, the column structure includes an outer columnar member 48 disposed about an inner columnar member 50 for telescoping movement relative thereto, the inner columnar member projecting from the interior of the vehicle body through an aperture in the firewall 22. As seen best in FIGS. 2 and 3, the column structure 42 further includes a steering shaft 52 rotatably supported at the top of the outer column member 48 and at the bottom of the inner columnar member 50. The steering shaft has a steering wheel 54 attached at one end thereof and is connected to the vehicle steering gear, not shown, at the other end through a flexible coupling 56. A cylindrical shift tube 58 surrounds a steering shaft and is connected to a selector level 60 through a rotatable shift bowl 62 and, outside the firewall 22, to the vehicle transmission through conventional linkage, not shown.

The inner columnar member 50 is attached to the firewall 22 and restrained against axial bodily movement by an anchor 64. The outer columnar member is axially bodily movable but normally maintained in fixed relation to the inner columnar member by energy absorbing means, not shown, disposed between the two members. Under an axial compressive impact, the column structure collapses in an energy absorbing mode with the outer columnar member moving axially leftwardly and telescoping over the inner columnar member.

Referring now to FIGS. 1, 2, 3, and 4, the mounting arrangement 44, which in its basic form is similar to that disclosed in the copending application of Gary L. Arntson, Ser. No. 173,493 and assigned to the assignee of this invention, includes a combination support and guide member 66. The combination member has a pair of coplanar bearing surfaces 68, FIGS. 2, 3, and 4, each bearing surface being bounded along its outboard edge by an integral longitudinal side flange 70 and having an aperture 72 therethrough adjacent the forward edge thereof. The bearing surfaces 68 are joined by an integral relieved web portion 74 which is extended at one end to form a structurally rigid leg 76 terminating in a flange 78, the flange 78 being rigidly attached to the horizontal side 28 of the firewall by a bolt 80, FIG. 2. A generally flat strut 82, reinforced for rigidity, includes a flange 84 having spaced apertures 85 therein, the flange being preformed to fit over the bearing surfaces 68 and the interconnecting web 74 85 the apertures 85 in register with the apertures 72 in the combination member. The strut is welded or otherwise rigidly secured to vertical side 30 of the firewall.

As seen best in FIGS. 3 and 4, the mounting arrangement further includes a bracket 86 having integral therewith a pair of side projections or lugs 88. The bracket is rigidly attached to the outer columnar member 48 of the column structure by a plurality of bolts 90, the bracket being maintained a predetermined distance away from the columnar member 48 by a plurality of spacers 92. Each lug 88 is oriented transversely of the column structure and includes an outwardly opening slot 94, FIG. 4, adapted to slidably receive respective ones of a pair of mounting capsules 96, each mounting capsule having an elongated aperture 98 therein. Each capsule is releasably secured to the corresponding lug by a plurality of plastic shear pins, not shown, injection molded within aligned apertures in the capsules and in the lugs.

The bracket 86 is located along the length of the outer columnar member 48 such that in the normal un-collapsed condition of the column structure, FIGS. 1 and 2, the elongated apertures 98 in the mounting capsules 96 register with the registered apertures 85 and 72 in the strut and the combination member respectively. As seen best in FIG. 3, respective ones of a pair of bolts 100 project through the registered apertures and are retained by respective ones of a pair of nuts 102. With the nuts 102 tightened against the mounting capsules, the combination member 66 and the strut 82 are joined into a structurally rigid unit forming a support remote from the instrument panel structure for the steering wheel end of the column structure 42. The nuts 102 also function to retain lugs 88 and thus hold the column structure generally rigidly against the support provided by the combination member and the strut, the column structure being oriented for optimum energy absorbing performance under impact loading and for convenient manual operation of the steering wheel 54.

Referring to FIGS. 2, 3, 5, and 6, in the preferred embodiment of the invention, each side flange 70 on the combination member is provided with an integral, longitudinally extending, inturned bottom flange 104 extending in spaced relation to the corresponding one of the bearing surfaces 68. As best seen in FIG. 6, each bottom flange is disposed in tapered relation to the corresponding bearing surface 68 and has a relatively short lip portion 106 at the leading edge thereof. The bottom flanges 104 cooperate with the side flanges and the bearing surfaces of the combination member in defining a channel of progressively decreasing depth adapted to slidably receive the lugs 88 on the bracket 86 during energy absorbing collapse of the column structure. The depth of the channel thus defined varies from a maximum adjacent the lip portion 106 to a minimum adjacent the opposite end, the maximum depth exceeding the height of the lugs 88 and the minimum depth being less than the height of the lugs so that as the column structure collapses, the lugs become progressively more tightly wedged in the channel.

A typical operational sequence of the steering column assembly according to this invention is initiated by the imposition of a substantial compressive force on the steering wheel 54, as might occur during a collision. The compressive force is transferred to the outer columnar member 48 through the hub of the steering wheel with a portion of the force being directed generally axially of the column structure. The axially directed force component tends to initiate axial bodily movement of the outer columnar member 48 and the bracket 86 but is initially resisted by the plastic shear pins securing the mounting capsules to the bracket. When the axial force component achieves a predetermined minimum magnitude, the shear pins are fractured and the column structure is released for energy absorbing collapse.

The inertia of the column structure is, of course, overcome very rapidly as energy absorbing collapse begins so that by the time collapse has progressed to the point where the lugs 88 enter the channel defined by the bearing surfaces, the side flanges, and the bottom flanges, the force being exerted by the column structure on the body of the operator of the vehicle is substantially below the human tolerance level. To increase the energy absorbing efficiency of the steering column assembly, the taper of the bottom flange is predetermined to effect sliding and wedging engagement between the combination member and the lugs on the bracket after a desired amount of collapse at the low force level has been effected. As the bracket becomes progressively more tightly wedged within the combination member, the force exerted by the latter on the former and resisting collapse of the column structure increases so that the magnitude of the force experienced by the body of the operator effecting absorption of the energy thereof increases from the low level toward the tolerance level to thus provide more efficient energy absorption. The taper is not, of course, so great as to cause the collapse of the column structure to be completely halted.

Referring now to FIGS. 7 and 8, one modified embodiment of the steering column assembly according to this invention is there shown including a modified combination support and guide member designated generally 66'. The modified combination member 66' includes a pair of bearing surfaces, a pair of side flanges, and a pair of bottom flanges integral with the side flanges, only right bearing surface 68', right bottom flange 104', and right side flange 70' being shown. The bottom flange 104' is disposed in parallel relation to the bearing surface 68' and each has a plurality of integral inturned tabs 108 formed therein. The tabs are disposed in the path of motion traversed by the bracket lugs 88 during energy absorbing collapse of the column structure. The lugs engage successive ones of the tabs upon collapse of the column structure and initiate successive bending and plastic deformation of each. Accordingly, a series of forces is imposed on the bracket resisting collapse of the column structure, the forces functioning to effect more efficient absorption of energy as recited hereinbefore.

Referring now to FIGS. 9 and 10, another modified embodiment of the steering column assembly according to this invention is there shown including a modified combination support and guide member designated generally 66''. The modified combination member 66'' includes a pair of bearing surfaces, a pair of side flanges, and a pair of bottom flanges integral with the side flanges, only right bearing surface 68'', right bottom flange 104'' and right side flange 70'' being shown. The bottom flange 104'' is disposed in parallel relation to the bearing surface 68'' and each has a plurality of raised ramp surfaces 110 disposed in the path of motion traversed by the lugs 88 on the bracket 86 during energy absorbing collapse of the column structure. The lugs engage successive ones of the ramp surfaces during collapse of the column structure and are progressively more tightly wedged between each ramp surface and the one of the bearing surface and the bottom flange opposing the particular ramp surface until that particular ramp surface is passed. Accordingly, a series of forces are imposed on the bracket resisting collapse of the column structure, the forces functioning to effect more efficient absorption of energy as recited hereinbefore.

Having thus described the invention, what is claimed is:

1. In an energy absorbing steering column assembly for an automotive vehicle body, said steering column assembly including a collapsible column structure having a first portion anchored to said vehicle body and restrained against axial bodily movement in at least one direction and a second portion releasably secured to said vehicle body and adapted for axial bodily movement in said one direction during energy absorbing collapse of said column structure, and further including a combination support and guide member rigidly attached to said vehicle body and a follower rigidly attached to said second portion of said column structure and releasably secured to said combination member, said follower and said combination member cooperating in maintaining said column structure in a predetermined attitude during energy absorbing collapse of the latter, the improvement comprising, supplementary energy absorbing means on said combination member engageable on said follower after a predetermined amount of energy absorbing collapse of said column structure and operative to effect a further absorption of energy by exerting a force on said follower opposing axial bodily movement of said second portion of said column structure in said one direction.

2. In an energy absorbing steering column assembly for an automotive vehicle body, said steering column assembly including a collapsible column structure having a first portion anchored to said vehicle body and restrained against axial bodily movement in at least one direction and a second portion adapted for axial bodily movement in said one direction during energy absorbing collapse of said column structure, a combination support and guide member rigidly attached to said vehicle body and defining a bearing surface bounded on opposite sides by a respective one of a pair of longitudinally extending side flanges, and a bracket rigidly secured to said second portion of said column structure and releasably fastened to said combination member, said bracket cooperating with said combination member in maintaining said column structure in a predetermined attitude during energy absorbing collapse, the improvement comprising, a bottom flange on each of said side flanges extending longitudinally of said vehicle body and in spaced relation to said bearing surface and cooperating with the latter in defining a channel adapted to receive said bracket during energy absorbing collapse of said column structure, and means on each of said bottom flanges and on said bearing surface adapted to engage said bracket after a predetermined amount of energy absorbing collapse of said structure and operative thereafter to exert a force on said bracket opposing bodily movement of said second portion of said column structure in said one direction thereby to effect further absorption of energy during energy absorbing collapse of said column structure.

3. In an energy absorbing steering column assembly for an automotive vehicle body, said steering column assembly including a collapsible column structure having a first portion anchored to said vehicle body and restrained against axial bodily movement in at least one direction and a second portion adapted for axial bodily movement in said one direction during energy absorbing collapse of said column structure, a combination support and guide member rigidly attached to said vehicle body and defining a bearing surface bounded on opposite sides by a respective one of a pair of longitudinally extending side flanges, and a bracket rigidly secured to said second portion of said column structure and releasably fastened to said combination member, said bracket cooperating with said combination member in maintaining said column structure in a predetermined attitude during energy absorbing collapse, the improvement comprising, a longitudinally extending bottom flange on each of said side flanges disposed in tapering relation with respect to said bearing surface so that said bottom flanges cooperate with said bearing surface in defining a channel of progressively decreasing depth adapted to receive said bracket during energy absorbing collapse of said column structure, said bracket slidably engaging said bottom flanges and said bearing surface after a predetermined amount of energy absorbing collapse of said column structure and thereafter being progressively more tightly wedged therebetween so that a force is exerted on said bracket opposing bodily movement of said second portion of said column structure in said one direction thereby to effect further absorption of energy during energy absorbing collapse of said column structure.

4. In an energy absorbing steering column assembly for an automotive vehicle body, said steering column assembly including a collapsible column structure having a first portion anchored to said vehicle body and restrained against axial bodily movement in at least one direction and a second portion adapted for axial bodily movement in said one direction during energy absorbing collapse of said column structure, a combination support and guide member rigidly attached to said vehicle body and defining a bearing surface bounded on opposite sides by a respective one of a pair of longitudinally extending side flanges, and a bracket rigidly secured to said second portion of said column structure and releasably fastened to said combination member, said bracket cooperating with said combination member in maintaining said column structure in a predetermined attitude during energy absorbing collapse, the improvement comprising, a bottom flange on each of said side flanges extending longitudinally and in spaced relation to said bearing surface and cooperating with the latter in defining a channel adapted to receive said bracket during energy absorbing collapse of said column structure, and means defining a plurality of longitudinally extending and longitudinally spaced ramp surfaces on said bottom flanges and on said bearing surface, said ramp surfaces being disposed in the path of motion of said bracket so that the latter engages successive ones of said ramp surfaces after a predetermined amount of energy absorbing collapse of said column structure and is progressively more tightly wedged between each of said ramp surfaces and the corresponding one of said bottom flanges and said bearing surface so that a series of forces is exerted on said bracket opposing bodily movement of said second portion of said column structure in said one direction thereby to effect further absorption of energy during energy absorbing collapse of said column structure.

5. In an energy absorbing steering column assembly for an automotive vehicle body, said steering column assembly including a collapsible column structure having a first portion anchored to said vehicle body and restrained against axial bodily movement in at least one direction and a second portion adapted for axial bodily movement in said one direction during energy absorbing collapse of said column structure, a combination support and guide member rigidly attached to said vehicle body and defining a bearing surface bounded on opposite sides by a respective one of a pair of longitudinally extending side flanges, and a bracket rigidly secured to said second portion of said column structure and releasably fastened to said combination member, said bracket cooperating with said combination member in maintaining said column structure in a predetermined attitude during energy absorbing collapse, the improvement comprising, a bottom flange on each of said side flanges extending longitudinally and in spaced relation to said bearing surface and cooperating with the latter in defining a channel adapted to receive said bracket during energy absorbing collapse of said column structure, and means defining a plurality of integral longitudinally spaced in-turned tabs on each of said bottom flanges and on said bearing surface disposed in the path of motion of said bracket, said bracket engaging successive ones of said tabs after a predetermined amount of energy absorbing collapse of said column structure and effecting plastic deformation of said tabs in response to continued energy absorbing collapse of said column structure so that a series of forces is exerted on said bracket opposing bodily movement of said second portion of said column structure in said one direction thereby to effect further absorption of energy during energy absorbing collapse of said column structure.

* * * * *